June 11, 1940.  E. H. ARMSTRONG  2,203,712
RADIO TRANSMITTING SYSTEM
Filed Aug. 25, 1936   2 Sheets-Sheet 1

INVENTOR.
Edwin H. Armstrong.
BY Moses & Nolte
ATTORNEYS

Patented June 11, 1940

2,203,712

UNITED STATES PATENT OFFICE 2,203,712

RADIO TRANSMITTING SYSTEM

Edwin H. Armstrong, New York, N. Y.

Application August 25, 1936, Serial No. 97,738

3 Claims. (Cl. 172—281)

This invention relates to a method of improving the efficiency of frequency multipliers which is particularly useful in ultrahigh frequency transmitters.

The object of the invention is to decrease the losses which occur within the vacuum tubes of the transmitter at those points which limit the output so that both by reason of the reduced losses and the removal of the heating limitations greater output is obtained.

Figure 1:
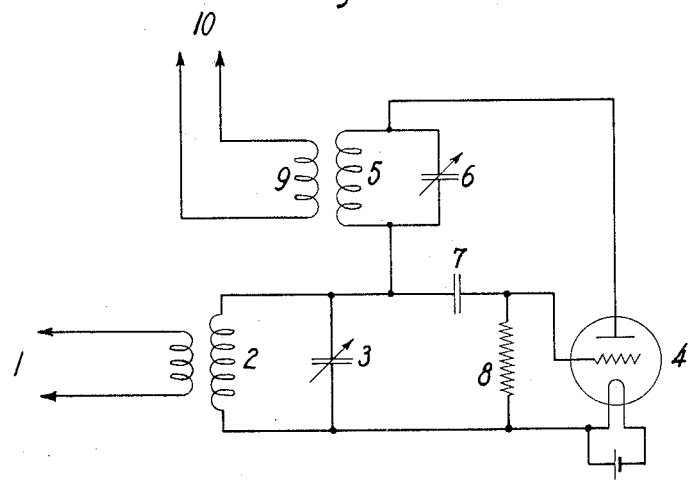
Figure 2:
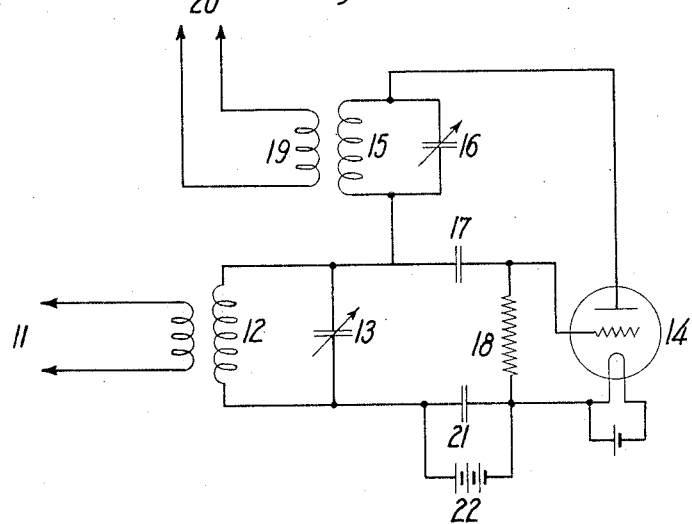
Figure 3:
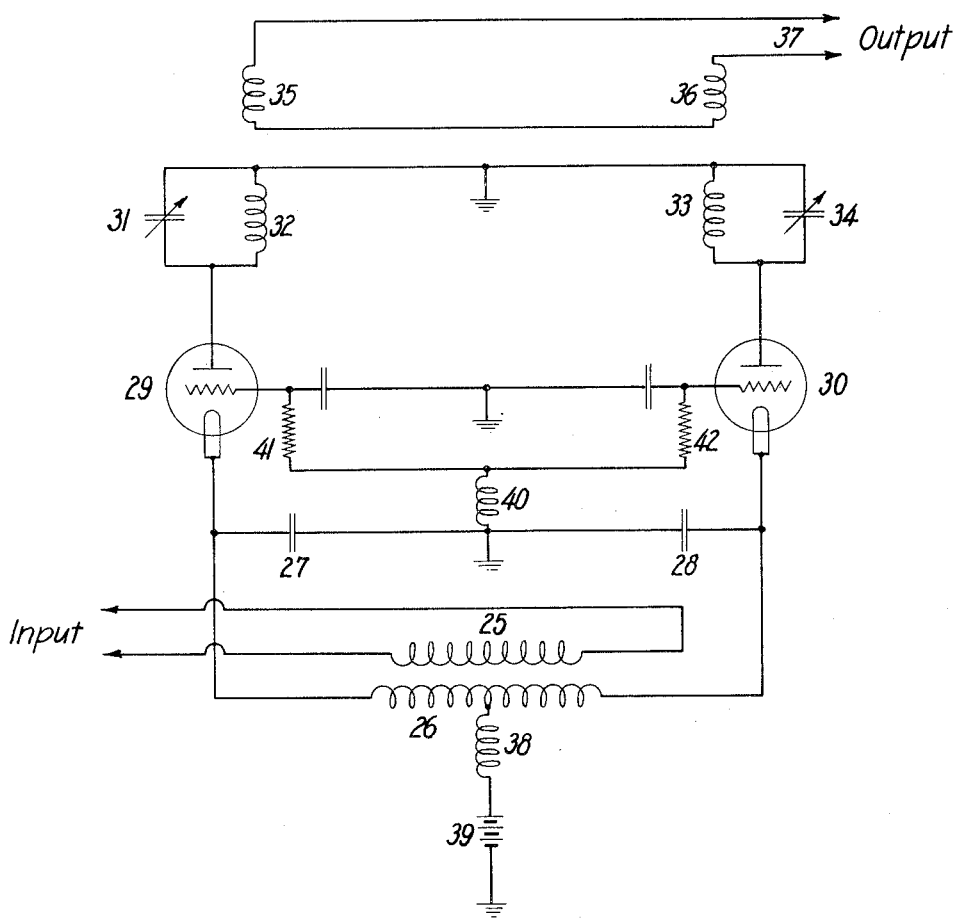

Fig. 1 shows an arrangement illustrating the general principle involved and Fig. 2 an arrangement for increasing the power output of the arrangement of Fig. 1. Fig. 3 shows a symmetrical arrangement which it is desirable to use in the practical carrying out of the invention.

The general principle involved may be understood from the following analysis. It is well known that vacuum tubes may be used as frequency multipliers by exciting their grids at a given frequency and tuning their plate circuits to some multiple of this frequency. It is well known that to obtain the best efficiency the grids must be biased heavily negative and a large amount of grid excitation provided. It is likewise well known that the efficiency of the multiplying process decreases as the frequency is increased and that the same limitation appears as in the case of a vacuum tube used as an amplifier at high frequencies, viz., the charging current required to properly excite the tube becomes so great, as do also the dielectric losses in the grid seals, that failure at this point due to heating of the glass limits the output which may be realized.

On account of the reactions occurring within the tube and for constructional reasons this difficulty is much worse with the grid than with the plate seal and in certain forms of tubes may be made almost negligible for the latter.

This invention greatly reduces the difficulty at the grid seal by reducing the amount of excitation which is required on the grid to cause the tube to act as an efficient multiplier.

The invention consists in applying the frequency to be multiplied to the actuation of both the grid and plate circuits, varying both potentials simultaneously and in proper phase relation so that the efficiency of multiplication is increased, the loss within the tube is decreased, and therefore its ability to handle power is increased. With this system of excitation it is possible to dispense entirely with the direct current plate supply normally used without interfering with the efficiency of multiplication.

Under certain conditions direct current may be supplied the plate with an increase in the power output.

The general theory of operation may be understood by reference to Fig. 1 which illustrates a simple form of the invention. In this figure, 1 represents the input of the frequency to be multiplied and 2, 3 a circuit tuned to this frequency. 4 represents the vacuum tube and 5, 6 a circuit tuned to some multiple of the input frequency. 7 represents the usual grid condenser, and 8 the usual grid leak. 9 is a coupling coil for taking the multiplied output current from the circuit 5, 6 and supplying it to the load 10.

The process which produces the greater efficiency is the following: It is well established that for the most efficient operation of high frequency amplifiers and multipliers that so-called Class C type of operation should be used. That is, the bias voltage on the grid circuit is made sufficiently high with respect to the amount of excitation and the direct current plate voltage that current through the tube flows for only a short part of the positive cycle of the excitation. To produce this type of action requires a high bias and a correspondingly high degree of excitation and this means a large charging current in the grid leads. Working against the action of the grid is the action of the plate. When the grid is driven negative tending to cut the current off, the reaction of the plate load drives the plate voltage more positive tending to maintain the current through the tube. As a result of this still higher grid excitation becomes necessary with consequent greater strain on the grid seal.

In accordance with this invention this effect is avoided by applying the excitation voltage in the proper phase to the plate as well as to the grid, so that the plate voltage is driven in the same direction as the grid voltage, thereby producing an effective cut off with a lesser amount of grid excitation than would otherwise be required.

With frequency multipliers it is not normally required that neutralization be employed although at the higher frequencies oscillation will sometimes occur with the excitation removed. With the present arrangement the system of circuits is not inherently regenerative and is therefore well adapted for operation without neutralization if a plate power supply is used in addition to the excitation from the previous stage. It is then possible to secure additional power output from the multiplier. The circuit for this type of operation is then as illustrated in Fig. 2 which is the same as the arrangement of Fig. 1 except for the inclusion of the plate power supply.

In practical applications of amplifiers at ultra-high frequencies it is always necessary to use neutralization. This has the effect of greatly increasing the charging current required to excite the grid. By the use of a multiplier this neutralization is dispensed with and hence a further advantage obtained.

In practice it is desirable to have some part of the transmitter at ground potential. It is also advisable at high frequencies to use some symmetrical arrangement employing a balanced tube system such as a push pull or other arrangements of the circuits. Fig. 3 illustrates an arrangement of circuits in which a symmetrical set up is employed and in which a system of excitation is employed which makes it feasible to ground the system in the most effective way.

Referring now to Fig. 3, 25 represents the input of the frequency to be multiplied, 26 the secondary of a transformer tuned to this frequency by the condensers 27 and 28, and 29, 30 the vacuum tubes whose filaments are connected respectively to each end of the inductance 26. In each plate circuit is a tuned circuit adjusted to be resonant to some multiple of the frequency to be multiplied. In the present case the circuits 31, 32 and 33, 34 may be considered tuned to the double of the fundamental frequency. The outputs of these two circuits are combined by means of the coupling coils 35, 36 and fed to the load at 37. Where it is feasible to increase the power output by means of an additional supply of power to the plates by means of a direct current supply, this may be done by feeding the supply from the source 39 through a choke 38 to the mid point of the inductance 26. 40, 41, and 42 represent the usual grid choke and grid leak arrangements.

It will be observed that the mid point of the condenser bridge 27, 28, the mid point of the connection to the grids and the mid point of the two tuned plate circuits are connected to ground. This gives a symmetrical arrangement which operates very well in practice and which is particularly useful when the tuned circuits have the character of either open or concentric line sections which are desirable for use on the ultra-short wavelengths. It will also be observed that the driving power is supplied to the filament circuit and that the potential of the filaments varies, with respect to ground at a high frequency rate. It is necessary, therefore, to supply the heating current to these filaments through choke coils or through a double winding on the secondary of the transformer 26, or in cases where line sections are employed, by the use of tubular conductors for the radio frequency currents which permit the running of the heating conductors through their center in a manner which is well known.

The operation of the system of Fig. 3 is along the same principles which have already been described for Figs. 1 and 2 except that the arrangement of Fig. 3 represents a more desirable form for use at ultrahigh frequencies.

I have described what I believe to be the best embodiments of my invention. I do not wish, however, to be confined to the embodiments shown, but what I desire to cover by Letters Patent is set forth in the appended claims.

I claim:

1. A frequency multiplier, comprising a tube having a grid and a plate, an input circuit for said grid and an output circuit for said plate, and means for applying the frequency to be multiplied, not only to the grid, but also to the plate in substantially the same phase.

2. A frequency multiplier, comprising a pair of tubes, each having a grid and a plate, said tubes being connected in push pull arrangement, and each tube having an input circuit for the grid and an output circuit for the plate, and means for applying the frequency to be multiplied not only to the grid of each tube, but also to the plate thereof in substantially the same phase.

3. Apparatus for improving the efficiency of a frequency multiplier comprising a vacuum tube having a plate, a grid and an emitting electrode, said apparatus comprising means for applying the frequency to be multiplied to the vacuum tube so as to vary the potential of the grid and plate simultaneously and in substantially the same phase with respect to the emitting electrode and means for absorbing energy from the plate circuit of the vacuum tube at a frequency which is a multiple of the original frequency.

EDWIN H. ARMSTRONG.